(12) United States Patent
Semenov et al.

(10) Patent No.: US 7,346,889 B1
(45) Date of Patent: Mar. 18, 2008

(54) METHOD AND SYSTEM FOR BUILDING MESSAGE INSTANCES

(75) Inventors: Sergei Borisovich Semenov, Sherman Oaks, CA (US); Skirmantas Kligys, Santa Monica, CA (US)

(73) Assignee: Oracle International Corporation, Redwood Shores, CA (US)

( * ) Notice: Subject to any disclaimer, the term of this patent is extended or adjusted under 35 U.S.C. 154(b) by 537 days.

(21) Appl. No.: 10/346,309

(22) Filed: Jan. 16, 2003

(51) Int. Cl.
*G06F 9/44* (2006.01)
*G06F 3/00* (2006.01)

(52) U.S. Cl. .............. 717/106; 719/314; 719/315; 719/316; 719/317; 719/318

(58) Field of Classification Search ........ 717/106–113; 715/765; 709/209, 237; 345/758, 744; 707/102; 719/314–319
See application file for complete search history.

(56) References Cited

U.S. PATENT DOCUMENTS

| | | | | |
|---|---|---|---|---|
| 6,442,748 | B1 * | 8/2002 | Bowman-Amuah | 717/108 |
| 6,757,900 | B1 * | 6/2004 | Burd et al. | 719/316 |
| 6,889,363 | B2 * | 5/2005 | Maloney | 715/765 |
| 7,159,224 | B2 * | 1/2007 | Sharma et al. | 719/310 |
| 2002/0083192 | A1 * | 6/2002 | Alisuag | 709/237 |
| 2002/0122057 | A1 * | 9/2002 | Maloney | 345/744 |
| 2002/0161749 | A1 * | 10/2002 | Pratt | 707/3 |
| 2003/0105884 | A1 * | 6/2003 | Upton | 709/318 |
| 2004/0034848 | A1 * | 2/2004 | Moore et al. | 717/117 |
| 2004/0054744 | A1 * | 3/2004 | Karamchedu et al. | 709/206 |
| 2004/0059744 | A1 * | 3/2004 | Duncan et al. | 707/102 |
| 2004/0125131 | A1 * | 7/2004 | Phelps | 345/738 |
| 2005/0060202 | A1 * | 3/2005 | Taylor et al. | 705/2 |
| 2006/0004745 | A1 * | 1/2006 | Kuhn et al. | 707/4 |

OTHER PUBLICATIONS

XML <-> HL7 Translation, http://www.interfaceware.com/manual/xml.html, downloaded on Mar. 8, 2006.*
Berler et al., Design of an interoperability framework in a regional healthcare system, IEEE, 2004, pp. 3093-3096 vol. 4.*
Der-Ming Liou et al., Design and implementation of a Web-based HL7 validation system, IEEE, Nov. 9-10, 2000 pp. 347-352.*
http://www.hl7.org/, downloaded on Mar. 8, 2006, pp. 1-10.*
HL7 Version 3 Statements of Pronciples, http://www.hl7.org/, 1998, downloaded on Mar. 9, 2006,pp. 1-10.*

(Continued)

*Primary Examiner*—Wei Zhen
*Assistant Examiner*—Satish S Rampuria
(74) *Attorney, Agent, or Firm*—Bingham McCutchen LLP

(57) ABSTRACT

Shown is an improved method and system for implementing and building messages, such as HL7-based messages. Messages are constructed in a format-independent manner, in which a message is built by instantiating and linking Java classes. Metadata for the message specifications are used to construct the Java class libraries. Signature of the classes automatically cause the messages to be constructed with correct syntax, structure, and restrictions. Thus, the correctness of the constructed messages can be enforced at compile time. Moreover, a developer can construct a specification-specific message without having to know XML.

52 Claims, 9 Drawing Sheets

OTHER PUBLICATIONS

[1998] SGML and XML as Interchange Formats for HL7 Messages, google.com, 1998, downloaded on Mar. 11, 2006, pp. 1-5.*
HL7 Version 2.x & 2.xml Implementation, downloaded on Mar. 11, 2006, pp. 1-104.*
Object-oriented model of a health care system, Krol, M.; Reich, D.L., Computer-Based Medical Systems, 1998. Proceedings. 11th IEEE Symposium on, Jun. 12-14, 1998, IEEE, pp. 40-43.*
A language for generating HL7 reformatting programs, Williams, C.E., Engineering in Medicine and Biology society, 1997. Proceedings of the 19th Annual International Conference of, vol. 3 Oct. 30-Nov. 2, 1997, IEEE,pp. 945-948 vol. 3.*
Design and implementation of a Web-based HL7 validation system, Der-Ming Liou; Ean-Wen Huang; Tsong-Tai Chen; Sheng-Hsiung Hsiao, Information Technology Applications in Biomedicine, 2000. Proceedings. 2000 IEEE EMBS International Conference on, 2000, IEEE, pp. 347-352.*
Use of XML technology in a virtual patient record infrastructure, Berler, A.; Konnis, G.; Pavlopoulos, S.; Karkalis, G.; Sakka, E.; Koutsouris, D., Information Technology Applications in Biomedicine, 2003. 4th International IEEE EMBS Special Topic Conference on, Apr. 24-26, 2003, IEEE, pp. 118-121.*

Beeler, George et al., "Message Development Framework", HL7 Modeling & Methodology Committee, Version, 3.3, Dec. 1999, pp. 4-1 through 6-47 and 10-1 through12-28, Health Level Seven, Inc.
Rishel, Wes, HL7 Modeling & Methodology and Control-Query Committees, Jan. 25, 1999, pp. 1-33.
"Thoughts on a Publication Format for Version 3 Messaging", Draft, Apr. 27, 1999, pp. 1-7.
HL7 Version 3—Message Element Type Language, Jan. 26, 1999, pp. 1-21.
Beeler, Jr., George W., "V3 Education: Building the HMD", http://www.mcls.duke.edu/standards/HL7/hl7.htm, Jan. 25, 1999.
Beeler, Jr., George, HL7 Reference Information Model, http://www.hl17.org/Library/data-model/RIM/C30202/rfm.htm, Nov. 22, 2003.
Boyer, Sandy, HL7 Vocabulary Domains, http://www.hl7.org/Library/data-model/RIM/C3020/vocabulary.htm, 2003.
The Apache XML Project, Xerces Java Parser Readme, http://xml.apache.org/xerces-j/, accessed on: unknown.
The Apache XML Project, Features, http://xml.ecache.org/xerces-j/features.html, accessed on: unknown.
The Apache XML Project, Properties, http://xml.apache.org/xerces-j/properties.html, accessed on: unknown.

* cited by examiner

Generated Java code for Location clone class

```
package oracle.apps.ctb.fwk.cmets.AMPR_CM_MT51000;
public class Location_AMPR_CM_MT51000 implements Validatable, XMLizable {
    // Constructors.
    public Location_AMPR_CM_MT51000();
    public Location_AMPR_CM_MT51000(Role_heir source);
    // Children factories.
    public Place_AMPR_CM_MT51000 create_mandatory_played_by_Place();
    public Place_AMPR_CM_MT51000 create_mandatory_played_by_Place(Place pl);
    // Attribute accessors.
    public CSDataType get_class_cd();
    public CEDataType get_cd();
    public void set_cd(CEDataType ce);
    public Collection get_id();
    // Association accessors.
    public void set_optional_is_scoped_by_Entity(Entity en);
    public Entity get_optional_is_scoped_by_Entity();
    public void set_mandatory_played_by_Place(Place_AMPR_CM_MT51000 place);
    public Place_AMPR_CM_MT51000 get_mandatory_played_by_Place();
    // Validation.
    public void validate() throws ValidationException;
    // DOM support.
    public Element getDOM(Document document, String tag);
}
```

402 — Constructors
404 — Children factories
406 — Attribute accessors
408 — Association accessors
410 — Validation
412 — DOM support

FIG. 4

Generated Java code for Place clone class

```
package oracle.apps.ctb.fwk.cmets.AMPR_CM_MT51000;
public class Place_AMPR_CM_MT51000 implements Validatable, XMLizable {
  // Constructors.
  public Place_AMPR_CM_MT51000();
  public Place_AMPR_CM_MT51000(Place source);
  // Children factories.
  public HealthcareFacility_AMPR_CM_MT51000
    create_optional_plays_HealthcareFacility();
  public HealthcareFacility_AMPR_CM_MT51000
    create_optional_plays_HealthcareFacility(Role r);
  public HasPresence_AMPR_CM_MT51000
    create_optional_plays_HasPresence();
  public HasPresence_AMPR_CM_MT51000
    create_optional_plays_HasPresence(Role r);
  // Attribute accessors.
  public CSDataType get_class_cd();
  public CSDataType get_determiner_cd();
  public CEDataType get_cd();
  public void set_cd(CEDataType ce);
  // Collection<IIDataType>.
  public Collection get_id();
  public EDDataType get_desc();
  public void set_desc(EDDataType ed);
  public ADDataType get_addr();
  public void set_addr(ADDataType ad);
  public EDDataType get_directions_txt();
  public void set_directions_txt(EDDataType ed);
  public EDDataType get_position_txt();
  public void set_position_txt(EDDataType ed);
  public STDataType get_gps_txt();
  public void set_gps_txt(STDataType st);
  // Collection<ENDataType>.
  public Collection get_nm();
  // Association accessors.
  // Collection<HealthcareFacility_AMPR_CM_MT51000>.
  public Collection get_optional_plays_HealthcareFacility();
  // Collection<HasPresence_AMPR_CM_MT51000>.
  public Collection get_optional_plays_HasPresence();
  // Validation.
  public void validate() throws ValidationException;
  // DOM support.
  public Element getDOM(Document document, String tag);
}
```

FIG. 5

How an application builds a message

```
ALocation_AMPR_PA_MT00181 aloc = new ALocation_AMPR_PA_MT00181();
aloc.set_id(new IIDataType("123.89.283.293.233"));
aloc.set_status_cd(new CSDataType("new"));
aloc.set_activity_time(new GTSDataType("20000401031520.34-0500"));

PLocation_AMPR_PA_MT00181 ploc = aloc.create_mandatory_has_PLocation();
```
602
```
Location_AMPR_CM_MT51000 cmet = new Location_AMPR_CM_MT51000();
cmet.set_cd(new CEDataType("CARD"));
cmet.get_id().add(new IIDataType("821.12.1212.121.893"));
ploc.set_mandatory_has_as_participant_Location(cmet);
```
604
```
Place_AMPR_CM_MT51000 place = cmet.create_mandatory_played_by_Place(
    level1Place);

HealthcareFacility_AMPR_CM_MT51000 hf = place.create_optional_plays_HealthcareFacility();

HasPresence_AMPR_CM_MT51000 hp = place.create_optional_plays_HasPresence();

Place_AMPR_CM_MT51000 place2 = hp.create_optional_is_scoped_by_Place();
place2.get_nm().add(ENDataType.createTestInstance(context));
place2.set_addr(ADDataType.createTestInstance(context));
```
606
```
aloc.validate();

Element el = aloc.getDOM(doc, "test_AMPR_PA_RM00181");
```

FIG. 6

Example of message creation

```xml
<a_Location>
  <actvtyTime/>
  <cd/>
  <class V="ACT"/>
  <id RT="123.89.283.293.233"/>
  <mood V="EVN"/>
  <status V="new"/>
  <has_P_Locn>
    <type V="LOC"/>
    <hasAsPartcpnt_LocnCMET>
      <cd V="CARD"/>
      <class V="PRSN"/>
      <id RT="821.12.1212.121.893"/>
      <playdBy_Place>
        <class V="PLC"/>
        <detrmnr V="INSTANCE"/>
        <plays_Healthcy>
          <class V="HCFAC"/>
        </plays_Healthcy>
        <plays_HasPrnce>
          <class V="PRSN"/>
          <isScopdBy_Place>
            <addr>
              <CTY>Pasadena</CTY>
              <STA>California</STA>
              <ZIP>91101</ZIP>
            </addr>
            <class V="PLC"/>
            <detrmnr V="INSTANCE"/>
            <nm>Cardiology Center</nm>
          </isScopdBy_Place>
        </plays_HasPrnce>
      </playdBy_Place>
    </hasAsPartcpnt_LocnCMET>
  </has_P_Locn>
</a_Location>
```

FIG. 7

METHOD AND SYSTEM FOR BUILDING MESSAGE INSTANCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND AND SUMMARY

The invention relates to computer systems, and more particularly to a method and mechanism for implementing and generating messages based on HL7 V3 Health Level Seven (HL7) Version 3 (V3) standard.

Computing systems often use the concept of messaging to communicate and exchange information between different systems or applications. Before the source and destination systems can adequately communicate using messages, the two systems should clearly agree upon the semantics and format of the messages and the information to be exchanged in the messages.

Specialized systems and applications may have a particular need to employ standardized or agreed-upon information models to structure and format messages. For example, consider a data item "observation" that may be exchanged between applications in the healthcare field. This data item may generically refer to any number of data formats, such as a numerical value, image, text, mixed values, etc. Because this data item may potentially be of such different formats, to adequately communicate this information, the source and destination systems that plan to exchange this information type may necessarily need to agree upon the semantics and format of the data.

In the field of healthcare applications, the Health Level Seven organization of Ann Arbor, Mich. has promulgated a standard/protocol known as HL7 to be used in the healthcare domain. HL7 is associated with a messaging standard that enables disparate healthcare applications to set of clinical and administrative data. The HL7 Reference Information Model (RIM) is the basis of the HL7 V3 standard. The RIM is a pictorial representation of the clinical data supported in the HL7 standard expressed in UML notation. Thus, the HL7 RIM is a shared information model between domains and is the model from which domains will create messages.

FIGS. 1a and 1b pictorially depict an example for managing location information in a clinical setting. Objects used in a diagram are specialization of objects defined by RIM. The data model shown in these figures describe the attributes, entry points, and relationship cardinality for data objects relevant to clinical information to be maintained and exchanged for managing location information. For example, Box 104 in FIG. 1a "A Location" corresponds to a role of a Location. Element 105 (participation) connects Role to an Act (Box 102). Box 104 in FIG. 1a provides the entry point for Box 106 in FIG. 1b. An HL7-based message relating to the action of managing location would serialize some or all of the information provided in this information model in a "hierarchical message definition" (HMD) that is a format independent method for encapsulating the information. Another HL7 methodology, Implementable technology specification (ITS) will define how format independent representation of a message defined by HMD can be converted to format specific message representation (e.g. Extensible Markup Language (XML), Common Object Request Broker Architecture (CORBA). Since both the sender and receiver would presumably have a working knowledge of HL7 V3 specifications, each party would be able to encrypt and decrypt a message in this format.

A recent release of HL7 (version 3) has defined the XML architecture as the preferred way of exchanging of clinical documents. The encoding for this standard is based on XML Schemas included in the HL7 version 3 specification (ITS) and its semantics are defined using the HL7 RIM. More information about the HL7 specification can be found at "hl7.org."

Possible approaches for building instances HL7 messages include using generic XML authoring tools (e.g. DOM API) or using tools that allow XML to be generated from database schemas with further transformation of the XML by means of XSLT into HL7-defined formats. The drawback with generic tools is that a developer is required to manually build the HL7 messages while knowing and understanding the exact requirements of the HL7 specifications. Moreover, before a developer can build an HL7 message, this approach necessarily requires the developer to also be familiar with XML. The drawback with using tools to allow XML to be generated from the database schemas is complex style sheet transformation that also presumes intimate knowledge of XML.

Accordingly, the present invention provides an improved method and system for implementing and building messages, such as HL7-based messages without knowledge by an application developer of specific format (e.g., XML) of a message. In an embodiment, messages are constructed in a format-independent manner, in which a message is built by instantiating and linking Java™ classes. Metadata for the message specifications are used to construct the Java class libraries. Signature of the classes automatically cause the messages to be constructed with correct syntax, structure, and restrictions. Thus, the correctness of the constructed messages to a large extent can be enforced at compile time. Moreover, a developer can construct a specification-specific message without having to know XML. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

FIGS. 4 and 5 show example Java code for clone classes for the data model shown in FIGS. 1a-b according to an embodiment of the invention.

FIG. 6 illustrates constructing a message for the data model shown FIGS. 1a-b according to an embodiment of the invention.

FIG. 7 illustrates constructed message for the data model shown FIGS. 1a-b according to an embodiment of the invention.

DETAILED DESCRIPTION

The present invention provides a method and system for implementing and building messages, such as HL7-based messages. In an embodiment, messages are constructed in a format-independent manner, in which a message is built by instantiating and linking Java classes. Signature of the classes automatically cause the messages to be constructed with correct syntax, structure, and restrictions. It is noted that while the present invention is illustrated with respect to HL7 messages in the XML format, the inventive concepts disclosed herein are not limited to this type of message formats, and indeed, may apply to a plurality of other messaging types and formats.

Figure 1A:
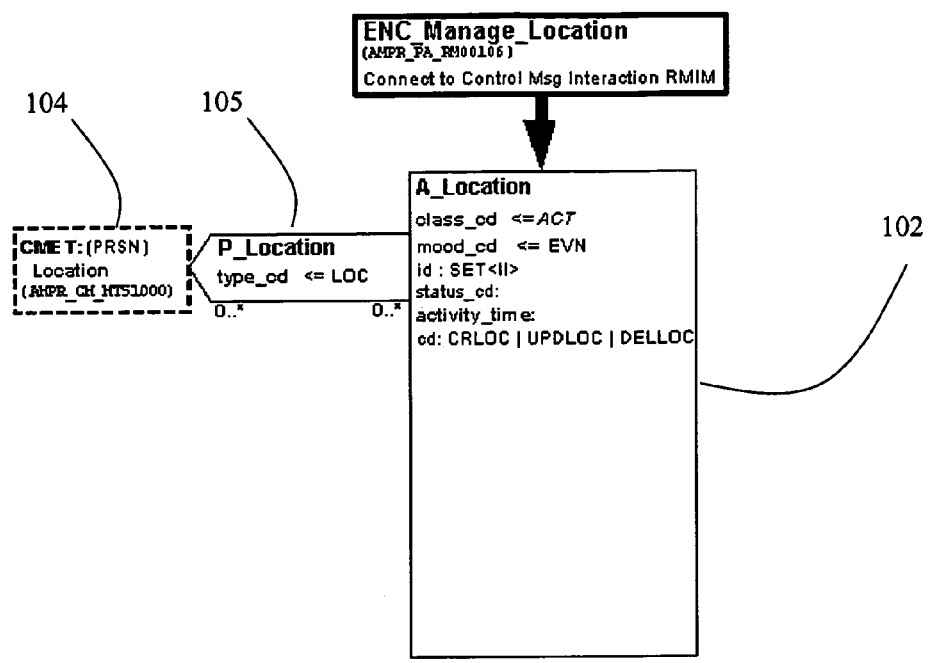
FIGS. 1a and 1b show an example of refined information models (RMIMs) based on HL7 RIM.
Figure 1B:
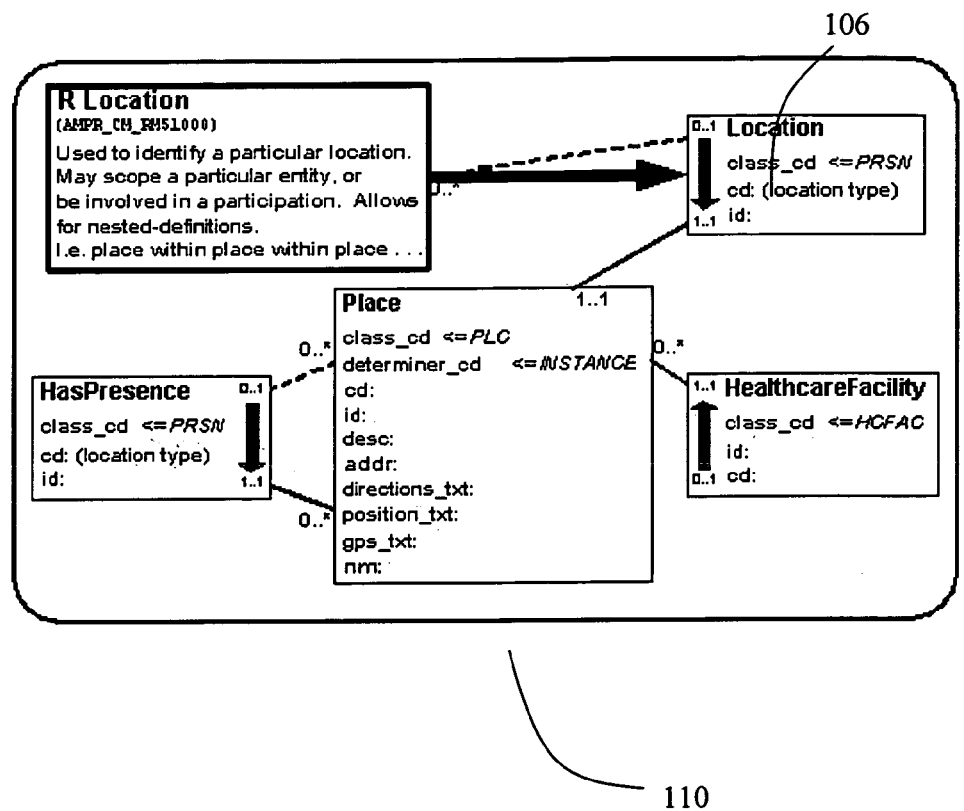
Figure 2:
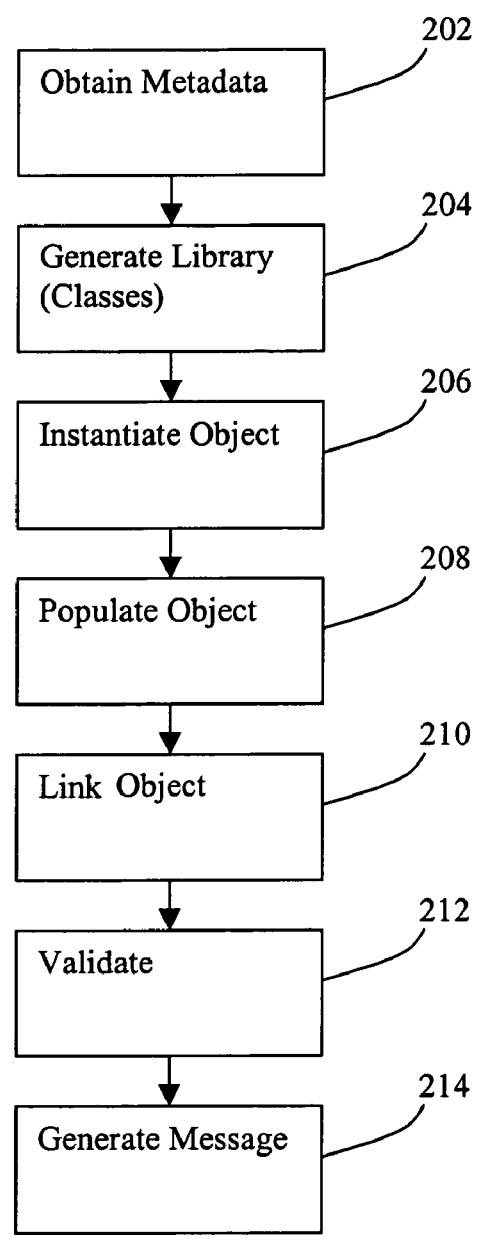
FIG. 2 shows a flowchart of a process for building a message according to an embodiment of the invention.

FIG. 2 shows a flowchart of a process for building HL7-based messages according to an embodiment of the invention. At 202, the HL7 RIM and message definition metadata is acquired for the pertinent information that is to be conveyed in the intended message, e.g., the RMIM information shown in FIGS. 1a-b. The acquired metadata can be in any recognizable format. In an embodiment, the meta data is acquired from the HL7 organization in the form of a Microsoft™ Access database.

At 204, the metadata is used to automatically generate Java classes, with the generated Java classes corresponding to clone classes designed in accordance with the HL7 Message Development Framework methodology. Each HL7-based message includes objects that are specific to the information-types that are intended to be encapsulated in that message. The generated class library will define the objects and their associated attributes for the message, as well as provide information allowing navigation between the objects in an organized manner and permitted manner (e.g., specifying cardinality restrictions on navigable relationships between objects). Thus, the Java classes will create the appropriate structures to implement these goals. For example, if there is at most a one-to-one relationship between two objects, then this cardinality will be enforced by definition as part of the created Java classes for these objects (generated java clone class corresponding to a parent will contain attribute corresponding to child object). In certain cases, the cardinality restrictions are enforced at run time, when an actual message instance is built (e.g. to enforce cardinality 1 . . *). Other and additional attribute restrictions can also be implemented by appropriate definition of the Java class for the restricted objects, e.g., to enforce attribute-type restrictions for objects.

In an embodiment, the generated JAVA class comprises:
Get, Set methods to manipulate attributes;
Method to access associated classes;
Copy Constructor to build object based on existing RIM-based objects; and
Constructor to set default values, which may be specific for a message.

In one embodiment, reusable components (CMETS) can be prebuilt at a runtime as a tree of linked JAVA classes.

To generate HL7 XML message using these classes, an application developer instantiates Java analogs of clone classes (206), populates these instantiations with the requisite data (208), and links them together (210). As noted above, the signature of the generated classes can enforce as much as possible the correctness of the messages at design time, during compilation of Java code, instead of at run time when message is actually built. In an embodiment, the signature of classes enforce proper assigned values to certain attributes by means of appropriate constructors instantiating and/or building objects based on existing objects. It ensures that only associations allowed for a particular message type can be followed and proper data types are used in a message type.

In an embodiment, validation occurs after the objects are instantiated and linked together (212). Only after the validation occurs is the HL7 message for these objects generated (214). This is in sharp contrast to the approach whereby generic XML authoring tools are used to manually build XML-based HL7 messages, since the present approach ensures that at least some validation can occur at design time rather than just at message creation time. In the present embodiment, after the XML-based message is built, a check can also be made against the message schema to perform an additional validation of the message. In this embodied approach the application developer does not have to know any details of a format of a generated message (e.g. XML). All format specific knowledge will be incorporated into generated java classes that is built by a developer of a library generator.

This approach can easily be extended to create messages using other messaging formats besides XML. This can be accomplished, for example, by modifying or creating new Java classes corresponding to clone classes for other messaging frameworks or methodologies, e.g., CORBA.

FIG. 4 shows an example JAVA clone class that can be generated for the "location" structure shown in Box 106 of FIG. 1b. Section 402 of this code example identifies constructors associated with this clone class.

Section 404 identifies the "children factories" for this class. When a message is created, there are a variety of ways to populate the message with information. For example, the message can be populated from existing objects or through a user interface. Section 404 in this example identifies methods for creation of children objects with proper cardinalities.

Section 406 in FIG. 4 provides the methods to access and set attributes in the clone class. Section 408 provides association accessors for the class. When a message is built, associated objects may already be in existence, e.g., a message can be built based on another message. Section 408 in the example can be used to create new object instances or to associate an object with one or more existing object instances. Section 410 identifies the validation method for the clone class. Section 412 identifies the method to generate an XML-based message, which can use any low level e.g. DOM API. Actual logic to implement validation of message instance and generation of message instance is implemented by the developer of a library generator. Validation logic will implement rules for constructing a message described in a Message Development Framework. The developer of a library generator will also implement logic for creation of a message in a format of choice (e.g. XML) by calls to a low level APIs (e.g. DOM).

In a similar manner, FIG. 5 shows an example JAVA clone class that can be generated for the "place" structure shown in Box 110 of FIG. 1b. This example shows only signature or a class with no implementations. Thus, this example JAVA code also identifies constructors, children factories, methods to access and set attributes, validation, and XML generation support for the associated clone class. In addition, this example JAVA code also identifies methods to manipulate collections of children objects.

FIG. 6 illustrates how an application would build an instance of a message corresponding to RMIM of FIGS. 1a-b based upon the generated clone classes. In particular, FIG. 6 shows an example of message construction by calling methods on generated Java classes corresponding to RMIM shown on FIGS. 1a-b. For example, section 602 corresponds to the "location" structure of Box 106 in FIG. 1b, which is implemented as the "location" clone class code of FIG. 4. Section 604 corresponds to the "place" structure of Box 110 in FIG. 1b, which is implemented as the "place" clone class code of FIG. 5. Similar sections exist for each appropriate structure in the data model shown in FIGS. 1a-b. Note the real-time validation step 606 that is implemented at the end of message construction process.

FIG. 7 illustrates an XML message instance corresponding to the RMIM message definitions from FIGS. 1a-1b. This message can be generated after message construction steps presented in FIG. 6 are complete.

Figure 3:
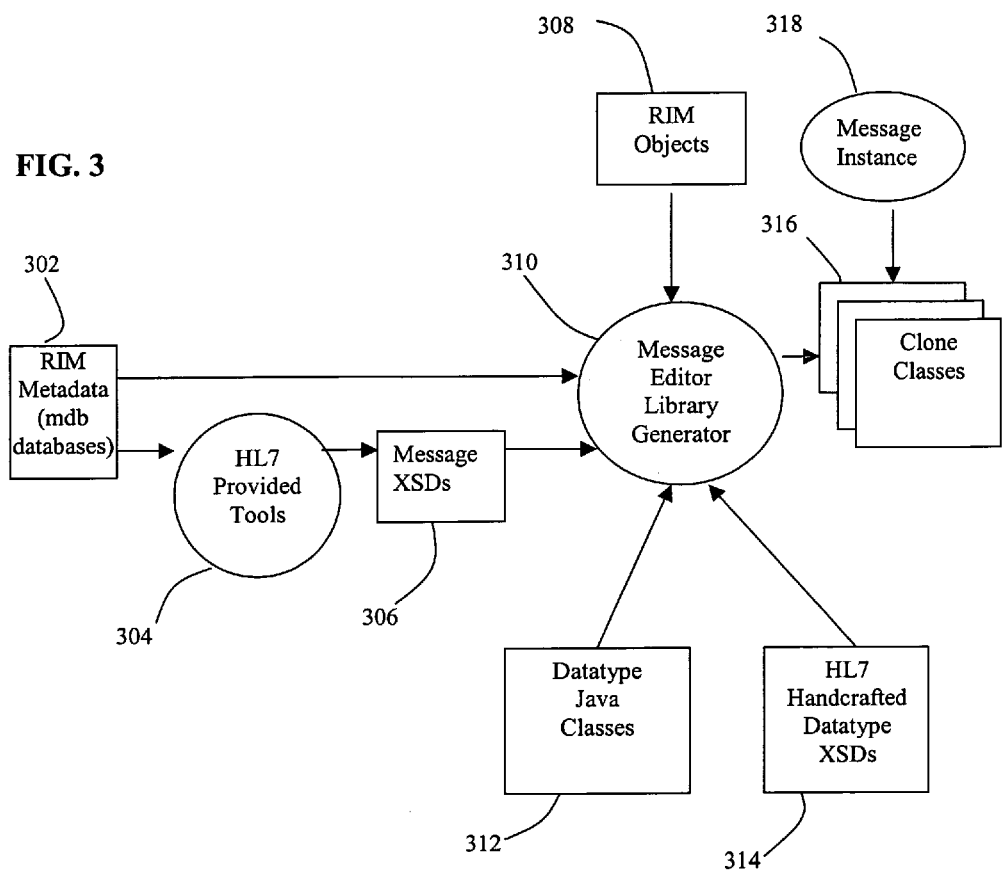
FIG. 3 depicts an architecture for building a message according to an embodiment of the invention.

FIG. 3 shows an architecture for implementing the process of FIG. 2 according to an embodiment of the invention. Module 302 represents the RIM metadata acquired from the HL7 standards organization. As stated above, this metadata can be in any supported format. The HL7 organization also provides tools 304 to assist in creating messages XSDs 306. More information about these tools can be found at "hl7.org." Using the RIM metadata 302, the message editor library generator module 310 creates a library of clone classes 316 corresponding to the data in the anticipated message instances. This library implements methods of validation of constructed messages against rules defined by Message Development Framework and optionally against XML schemas. Library also implements method(s) for generation of messages in the format of choice (e.g. XML). Handcrafted Java classes 312 implementing behavior of HL7 V3 datatypes are referenced and used by clone classes during construction of messages. Instantiation of Java classes corresponding to clone classes can be done based on instances of existing RIM objects 308. Message XSDs 306 and Datatype XSDs 314 can be used in generated clone classes to provide validation of generated XML instances against XML schemas.

Therefore, what has been shown is a method, system, and mechanism for implementing and building instances of messages. While the illustrated example is described with respect to instances of HL7 messages in XML format, it is noted that the described concepts are format-independent can be used to implement messages in any number of formats and for any number of applications.

System Architecture Overview

Figure 8:
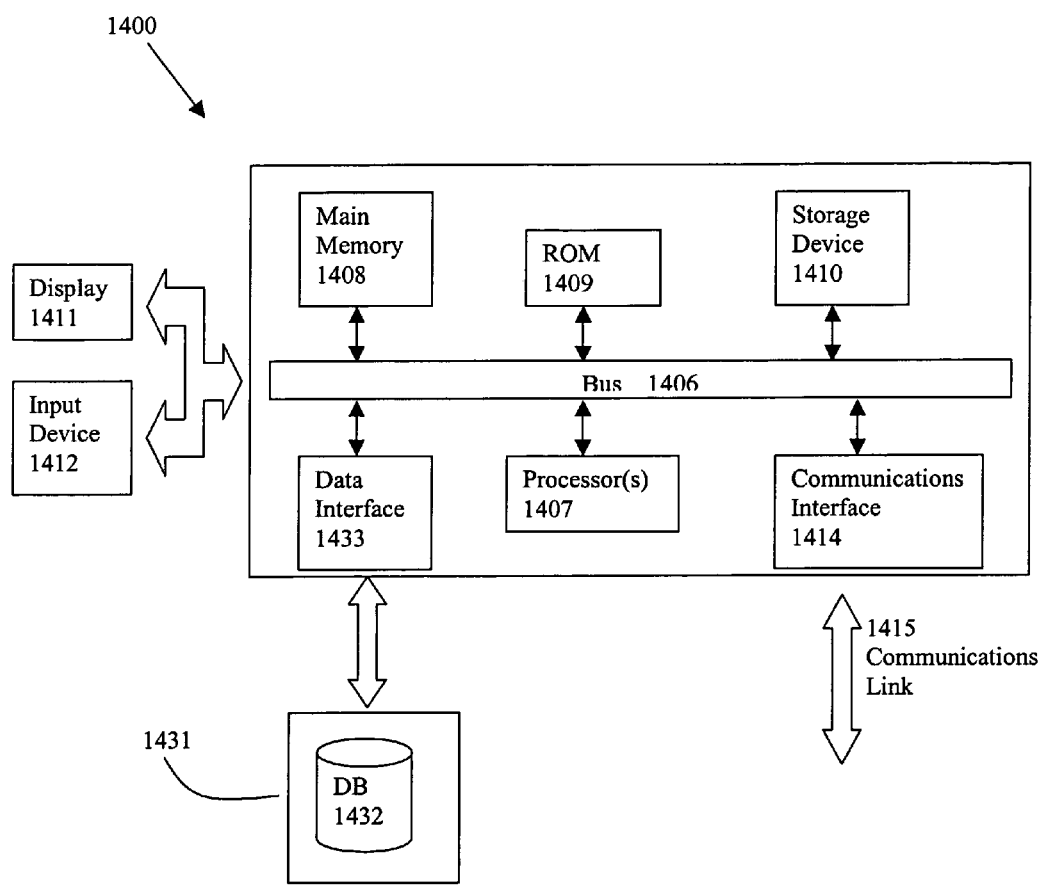
FIG. 8 is a diagram of a computer system with which the present invention can be implemented.

The execution of the sequences of instructions required to practice the invention may be performed in embodiments of the invention by a computer system 1400 as shown in FIG. 8. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combinations or ordering of process actions. The specification and drawings are, accordingly, to be regarded in an illustrative rather than restrictive sense.

What is claimed is:

1. A computer implemented method for building an instance of a HL7-compliant XML-based message, comprising:
   generating a library of object-oriented language classes from metadata corresponding to an HL7-compliant data model;
   instantiating a first object and a second object from the library of object-oriented language classes;
   populating the first object with first data and the second object with second data;
   linking the first object with the second object;
   validating the first and second objects by performing a cardinality-check for a link between the first object and the second object; and
   generating the instance of the HL7-compliant XML-based message based upon the first and second objects.

2. The computer implemented method of claim 1 in which the act of validating is performed based on cardinality defined in the HL7-compliant data model.

3. The computer implemented method of claim 1 in which the act of validating is performed at compile time.

4. The computer implemented method of claim 1 in which the act of validating is performed based upon enforcing signatures of the object-oriented language classes.

5. The computer implemented method of claim 4 in which the act of validating further comprises performing type-checking.

6. The computer implemented method of claim 1 in which cardinality-checking is performed at run time.

7. The computer implemented method of claim 1 in which the object-oriented language classes define associated objects and attributes.

8. The computer implemented method of claim 1 in which the object-oriented language classes provide information allowing navigation between objects.

9. The computer implemented method of claim 1 in which either the first or second objects is populated from an existing RIM object.

10. The computer implemented method of claim 1 in which XML for the instance is automatically generated.

11. The computer implemented method of claim 1 further comprising:
    obtaining metadata relating to an HL7-compliant data model.

12. A computer implemented method for building an instance of a message in a standard messaging format, comprising:
    obtaining metadata relating to a message data model;
    automatically generating a library of format-independent classes from the metadata;
    instantiating a first object and a second object from the library of format-independent classes;
    populating the first object with first data and the second object with second data; linking the first object with the second object;
    validating the first and second objects by performing a cardinality-check for a link between the first object and the second object; and
    generating the instance of the message in the standard messaging format based upon the first and second objects, wherein the instance of the message comprises an HL7-compliant XML-based message.

13. The computer implemented method of claim 12 further comprising the act of validating the instance of the message.

14. The computer implemented method of claim 13 in which the act of validating is performed based upon enforcing signatures of the format-independent classes.

15. The computer implemented method of claim 14 in which type-checking is performed in the act of validating.

16. The computer implemented method of claim 13 in which the act of validating is performed at compile time.

17. The computer implemented method of claim 12 in which the format-independent classes provide information allowing navigation between objects.

18. The computer implemented method of claim 12 in which either the first or second objects is populated from an existing data object.

19. The computer-implemented method of claim 12 in which the standard messaging format comprises either XML or CORBA.

20. The computer-implemented method of claim 12 in which the message data model comprises an HL7-compliant data model.

21. A computer implemented method for building an instance of a message in a standard messaging format, comprising:
    obtaining metadata relating to a message data model;

automatically generating a library of format-independent classes from the metadata, wherein the library of format-independent classes is retrievable to be used to instantiate a first object and a second object from the library of format-independent classes, in which the first object is populated with first data and the second object is populated with second data and the first object is capable of being linked with the second object validating the first and second objects by performing a cardinality-check for a link between the first object and the second object and generating the instance of the message in the standard messaging format based upon the first and second objects, wherein the instance of the message comprises an HL7-compliant XML-based message.

22. The computer-implemented method of claim 21 in which the standard messaging format comprises either XML or CORBA.

23. The computer-implemented method of claim 21 in which the in which the message data model comprises an HL7-compliant data model.

24. A computer implemented method for building an instance of a message in a standard messaging format, comprising:

accessing a library of format-independent classes generated from received metadata, the metadata related to the standard messaging format;

instantiating a first object and a second object from the library of format-independent classes;

populating the first object with first data and the second object with second data;

linking the first object with the second object;

validating the first and second objects by performing a cardinality-check for a link between the first object and the second object; and generating the instance of the message in the standard messaging format based upon the first and second objects, wherein the instance of the message comprises an HL7-compliant XML-based message.

25. The computer implemented method of claim 24 in which the act of validating is performed based on cardinality defined in the HL7-compliant data mode.

26. The computer implemented method of claim 24 in which the format-independent classes provide information allowing navigation between objects.

27. The computer implemented method of claim 24 in which either the first or second objects is populated form an existing data object.

28. The computer-implemented method of claim 24 in which the standard messaging format comprises either XML or CORBA.

29. A computer program product comprising a volatile or non-volatile computer usable medium having executable code to execute a process for building an instance of a HL7-compliant XML-based message, wherein the volatile or non-volatile computer usable medium is not a transmission medium, the process comprising:

generating a library of object-oriented language classes from metadata corresponding to an HL7-compliant data model;

instantiating a first object and a second object from the library of object-oriented language classes;

populating the first object with first data and the second object with second data; linking the first object with the second object;

validating the first and second objects by performing a cardinality-check for a link between the first object and the second object; and generating the instance of the HL7-compliant XML-based message based upon the first and second objects.

30. The computer program product of claim 29 in which the act of validating is performed based on cardinality defined in the HL7-compliant data model.

31. The computer program product method of claim 29 in which the act of validating is performed based upon enforcing signatures of the object-oriented language classes, type-checking, or cardinality-checking.

32. A system for building an instance of a HL7-compliant XML-based message, comprising:

means for generating a library of object-oriented language classes from metadata corresponding to an HL7-compliant data model, wherein the means for generating comprises a portion of a processor;

means for instantiating a first object and a second object from the library of object-oriented language classes;

means for populating the first object with first data and the second object with second data;

means for linking the first object with the second object;

means for validating the first object and the second object by performing a cardinality-check for a link between the first object and the second object; and means for generating the instance of the HL7-compliant XML-based message based upon the first and second objects.

33. The system of claim 32 in which the act of validating is performed based on cardinality defined in the HL7-compliant data model.

34. The system of claim 32 in which the act of validating is performed based upon enforcing signatures of the object-oriented language classes, type-checking, or cardinality-checking.

35. A computer program product comprising a volatile or non-volatile computer usable medium having executable code to execute a process for building an instance of a message in a standard messaging format, wherein the volatile or non-volatile computer usable medium is not a transmission medium, the process comprising:

obtaining metadata relating to a message data model;

automatically generating a library of format-independent classes from the metadata;

instantiating a first object and a second object from the library of format-independent classes;

populating the first object with first data and the second object with second data;

linking the first object with the Second object;

validating the first and second objects by performing a cardinality-check for a link between the first object and the second object; and generating the instance of the message in the standard messaging format based upon the first and second objects, wherein the instance of the message comprises an HL7-compliant XML-based message.

36. The computer program product of claim 35 in which the act of validating is performed based on cardinality defined in the HL7-compliant data model.

37. The computer program product of claim 35 in which the act of validating is performed based upon enforcing signatures of the object-oriented language classes, type-checking, or cardinality-checking.

38. The computer program product of claim 35 in which the format-independent classes provide information allowing navigation between objects.

39. The computer program product of claim 35 in which either the first or second objects is populated form an existing data object.

40. The computer program product of claim 35 in which the standard messaging format comprises either XML or CORBA.

41. A system for building an instance of a message in a standard messaging format, comprising:
means for obtaining metadata relating to a message data model;
means for automatically generating a library of format-independent classes from the metadata, wherein the means for automatically generating comprises a portion of a processor;
means for instantiating a first object and a second object from the library of format-independent classes;
means for populating the first object with first data and the second object with second data;
means for linking the first object with the second object;
means for validating the first and second objects by performing a cardinality-check for a link between the first object and the second object; and
means for generating the instance of the message in the standard messaging format based upon the first and second objects, wherein the instance of the message comprises an HL7-compliant XML-based message.

42. The system of claim 41 further comprising means for validating the instance of the message.

43. The system of claim 42 in which the means for validating is implemented based upon enforcing signatures of the object-oriented language classes, type-checking, or cardinality-checking.

44. The system of claim 41 in which the format-independent classes provide information allowing navigation between objects.

45. The system of claim 41 in which the standard messaging format comprises either XML or CORBA.

46. The system of claim 41 in which the message data model comprises an HL7-compliant data model.

47. A computer program product comprising a volatile or non-volatile computer usable medium having executable code to execute a process for building an instance of a message in a standard messaging format, wherein the volatile or non-volatile computer usable medium is not a transmission medium, the process comprising:
obtaining metadata relating to a message data model;
automatically generating a library of format-independent classes from the metadata;
instantiating a first object and a second object from the library of format-independent classes;
populating the first object with first data and the second object with second data;
linking the first object with the second object;
validating the first and second objects by performing a cardinality-check for a link between the first object and the second object; and
generating the instance of the message in the standard messaging format based upon the first and second objects, wherein the instance of the message comprises an HL7-compliant XML-based message.

48. The computer program product of claim 47 further comprising the act of validating the instance of the message.

49. The computer program product of claim 47 in which the message data model comprises an HL7-compliant data model.

50. A system for building an instance of a message in a standard messaging format, the process comprising:
means for obtaining metadata relating to a message data model;
means for automatically generating a library of format-independent classes from the metadata, wherein the means for automatically generating comprises a portion of a processor;
means for instantiating a first object and a second object from the library of format-independent classes;
means for populating the first object with first data and the second object with second data;
means for linking the first object with the second object;
means for validating the first and second objects by performing a cardinality-check for a link between the first object and the second object; and
means for generating the instance of the message in the standard messaging format based upon the first and second objects, wherein the instance of the message comprises an HL7-compliant XML-based message.

51. The system of claim 50 further comprising means for validating the instance of the message.

52. The system of claim 50 in which the message data model comprises an HL7-compliant data model.

* * * * *

UNITED STATES PATENT AND TRADEMARK OFFICE
CERTIFICATE OF CORRECTION

PATENT NO. : 7,346,889 B1
APPLICATION NO. : 10/346309
DATED : March 18, 2008
INVENTOR(S) : Semenov et al.

It is certified that error appears in the above-identified patent and that said Letters Patent is hereby corrected as shown below:

On Title page, in Item (56), under "Other Publications", line 8, delete "Pronciples," and insert -- Principles, --, therefor.

On page 2, in column 2, under "Other Publications", line 13, delete "hl17" and insert -- hl7 --, therefor.

On page 2, in column 2, under "Other Publications", line 18, delete "ecache" and insert -- apache --, therefor.

In column 1, line 18, after "on" delete "HL7 V3".

In column 2, line 13, delete "h17" and insert -- hl7 --, therefor.

In column 3, line 43, delete "java" and insert -- Java --, therefor.

In column 4, line 22, delete "java" and insert -- Java --, therefor.

In column 9, line 19–20, after "claim 21" delete "in which the".

In column 9, line 43, in claim 25, delete "mode" and insert -- model --, therefor.

In column 10, line 50, in claim 35, delete "Second" and insert -- second --, therefor.

Signed and Sealed this

Twenty-seventh Day of October, 2009

David J. Kappos
*Director of the United States Patent and Trademark Office*